(12) United States Patent
Boren

(10) Patent No.: US 7,715,433 B2
(45) Date of Patent: May 11, 2010

(54) UNIVERSAL CONTROLLER AND SIGNAL MONITOR

(76) Inventor: Gary W. Boren, 24702 Calle El Toro Grande, Lake Forest, CA (US) 92630

( * ) Notice: Subject to any disclaimer, the term of this patent is extended or adjusted under 35 U.S.C. 154(b) by 345 days.

(21) Appl. No.: 11/778,539

(22) Filed: Jul. 16, 2007

(65) Prior Publication Data
US 2008/0013569 A1    Jan. 17, 2008

Related U.S. Application Data

(60) Provisional application No. 60/831,074, filed on Jul. 14, 2006.

(51) Int. Cl.
*H04J 3/16* (2006.01)
(52) U.S. Cl. ............................ 370/466; 370/465
(58) Field of Classification Search ............... None
See application file for complete search history.

(56) References Cited

U.S. PATENT DOCUMENTS 6,549,966 B1 *  4/2003  Dickens et al. .............. 710/300
6,978,319 B1 * 12/2005  Rostoker et al. ............ 709/250
2006/0056450 A1 *  3/2006  Chalopin et al. ............ 370/466

* cited by examiner

*Primary Examiner*—Chi H Pham
*Assistant Examiner*—Kouroush Mohebbi
(74) *Attorney, Agent, or Firm*—Sean D. Burdick

(57) ABSTRACT

A universal controller supports multiple different computer protocols to enable endpoint communications between two or more electronic devices according to a desired protocol. Controller firmware modules embedded in an integrated circuit identify a particular protocol in a data communication received from a first external device, select from among multiple protocol drivers embedded in the modules a protocol driver corresponding to the particular protocol identified, and transmit content of the received data to one or more second external devices according to the particular protocol. The universal controller includes a bus translator module parsing bit streams received from the first external device into protocol data, status data, and content data, a protocol firmware module providing multiple different protocols drivers, and a control interface selecting, responsive to protocol data parsed, a particular protocol driver to establish data communication with a second external device according to the desired communication protocol. Data communication may originate from any of multiple second external devices, and different protocols may be transmitted simultaneously for multi-channel or redundant communication between the external devices.

17 Claims, 3 Drawing Sheets

UNIVERSAL CONTROLLER AND SIGNAL MONITOR

This application traces its filing priority to U.S. Provisional Patent Application No. 60/831,074, filed Jul. 14, 2006, which is fully incorporated herein by reference.

BACKGROUND

1. Field

The invention, relates generally to a computer system interface for effecting digital communication protocols. More specifically, the invention relates to a universal controller module that enables a computer to communicate with external devices using multiple different communication protocols.

2. Background

Currently in advanced industries, electronic communication between different electronic devices is essential. The ordered way of communicating between two (or more) electronic devices to allow data transfer can be described as a computing protocol.

A computing protocol (hereinafter "protocol") is a set of standard rules that controls or enables the connection, communication, and data transfer between two computing endpoints. The rules specify the syntax, semantics, and synchronization of data being communicated, for example, to allow for automated systems monitoring, testing or control. Protocols may be implemented by hardware, software, or a combination of the two to ensure reliable interchange of data over an imperfect communication channel so that the system works properly.

There are many different protocols in use today, most of which are defined by an industry standard such as IEEE, CAN and MIL-STD. Each of these standards typically requires a special instrument, special cabling, or a specific electronic device designed to support the protocol. For example, a common protocol in use today is the RS-485 protocol using the High Level Data Link Controller (HDLC). To employ this protocol, a specially made PC card, VXI card, PXI card, or a VME card must be purchased or manufactured, then programmed by the end user for its intended purpose. This is a typical requirement for most protocols, as almost every protocol known in the industry requires a designated interface card that is manufactured as a standalone unit.

For more complex systems that employ multiple protocols, designated interface cards add to the cost and complexity of the system. For example, in a system that employs RS-485/HDLC, GPIB, and ARINC-429 protocols, the end user must purchase device hardware to support three different protocols. Where restrictive spatial constraints exist, having to accommodate hardware to support multiple protocols complicates the packaging problem. A universal controller is needed to cope with the proliferation of protocol standards.

SUMMARY

The present invention addresses the foregoing problems by providing a single interface card that can support multiple different computer protocols to enable endpoint communications between two or more electronic devices according to a desired protocol. The invention is a universal controller and signal monitor having an integrated circuit such as an FPGA or ASIC loaded with firmware modules that identify the presence of a particular protocol in a data communication received from a first external device, select from among multiple protocol drivers embedded in the modules a protocol driver corresponding to the particular protocol identified, and transmit the content of the received data to a second external device according to the particular protocol. Data communication may be similarly established when originating from any of the multiple second external devices, and different protocols may be transmitted simultaneously for multi-channel or redundant communication between the external devices.

In one embodiment, the universal controller includes a bus translator module adapted to receive data from a first external device, a protocol firmware module providing a plurality of different protocols drivers embedded therein, and a control interface coupled to the bus translator module and to the protocol firmware module. Responsive to the bus translator parsing a bit stream received from the first external device into protocol data, status data, and content data, the control interface selects a particular protocol driver from the protocol firmware module for establishing data communication with a second external device according to the desired communication protocol. The integrated circuit includes a plurality of registers for storing the protocol data, status data, and content data, and a field interface for making physical connections to the second external devices. The interface card comprising the universal controller may include additional memory for storing data, a connector distribution module with high-frequency switching means for customizing signal paths from the protocol firmware module to the field interface, multiple different I/O ports at the field side of the field interface, a daughter card slot for installing additional protocol drivers, an optional fiber optic transceiver, and a DC power source.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

The present invention allows two or more digital electronic devices to communicate using multiple different protocols simultaneously, for applications such as automated control and signal monitoring. A system exploiting the present invention will realize many advantages including fewer components, less cabling, and a shorter time to market, along with attendant savings in the overall costs for system engineering and design. The invention is versatile, encapsulating some of the most commonly used field interface protocols in the industry today, without having to purchase numerous products.

Figure 1:
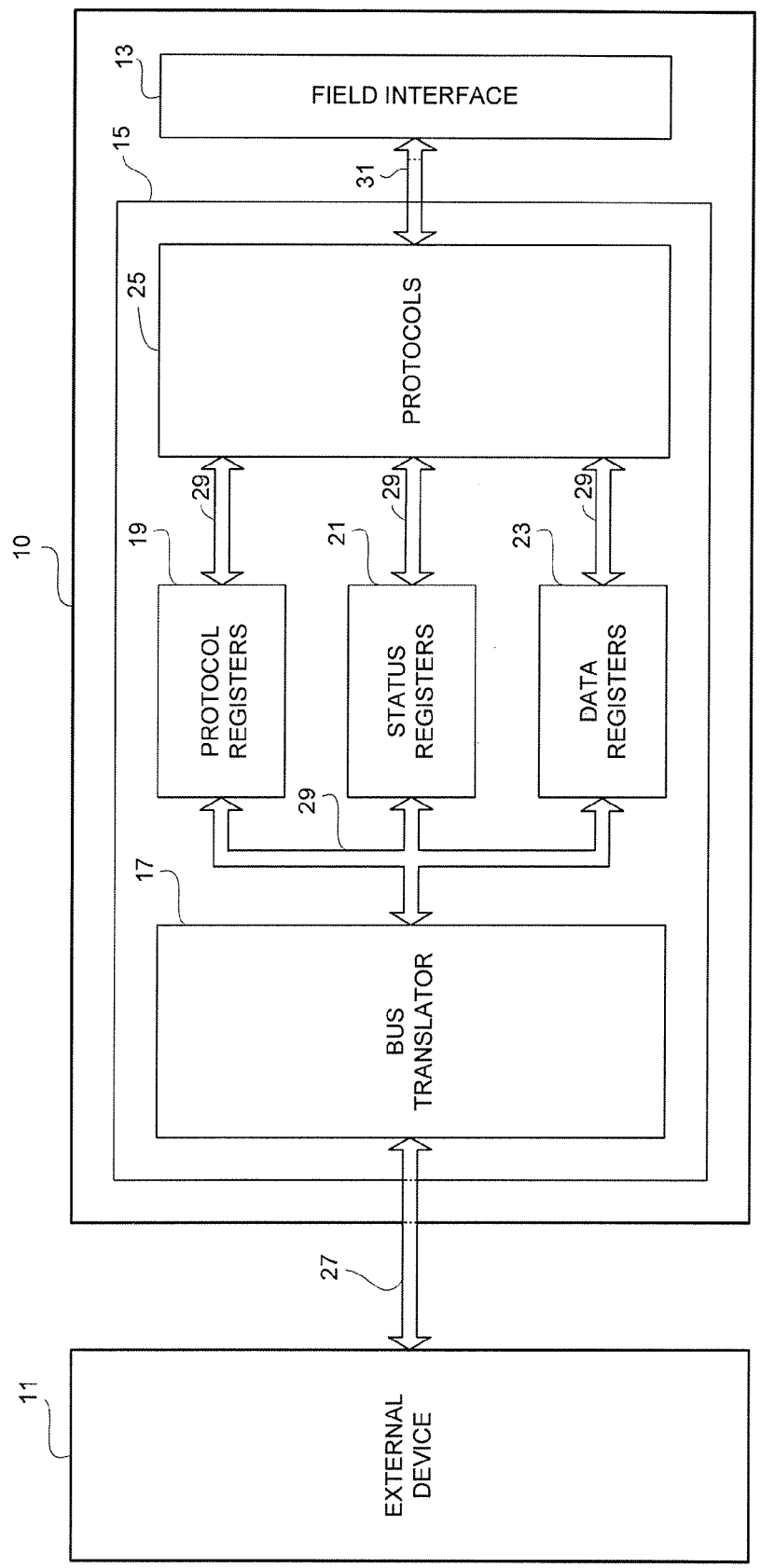
FIG. 1 is a block diagram of one embodiment of a universal controller according to the invention for enabling data communication between external devices using any of multiple communication protocols.

FIG. 1 shows a conceptual block diagram of one embodiment of a universal controller and signal monitor according to the invention. Hereafter, the universal controller and signal monitor depicted as item 10 in FIG. 1 may be referred to as universal controller board 10 or simply as universal controller 10. The main purpose of universal controller 10 is to effect digital communication between a first external device 11, and any number of second external devices connectable to universal controller 10 through a field interface 13. Preferably, universal controller 10 is manufactured on a single board or computer card that may easily interface with another electronic device (such as a PC) via common multi-pin electrical connectors attachable by cable or directly as a plug-in device.

An electronic circuit 15 provides the main functionality for the universal controller 10. In a preferred embodiment, circuit 15 is an integrated circuit such as a field programmable gate array (FPGA) or an application specific integrated circuit (ASIC). In one embodiment, circuit 15 may be a Xilinx type Virtex-4 or Virtex-5 FPGA. In another embodiment, for example, to support the ARINC-429 protocol, circuit 15 may be an SRAM based FPGA or ASIC. Generally, circuit 15 may include a bus translator module 17, protocol registers 19, status registers 21, data registers 23, and a protocol firmware module 25.

Universal controller 10 may function as an electronic translator to ensure that the proper protocol is used when establishing data communication between first external device 11 and one or more second external devices connectable through field interface 13. In a preferred embodiment, external device 11 represents a central controller or a means for establishing data communication with a central controller or remote computer. For example, external device 11 may represent any of the following components: a personal computer (PC), a microcontroller unit (MCU), a central processing unit (CPU), a universal serial bus (USB), a peripheral component interconnect (PCI) bridge, or a network connection such as an Ethernet link or cable. The foregoing list of an external devices 11 are provided as examples only, and not as an exhaustive list.

The bus translator module 17 is preferably a firmware module embedded within circuit 15. Bus translator module 17 receives and returns digital data from and to external device 11 by means of a data link 27. Data link 27 may be any suitable bus, interconnect, conductor, electrical connector, wireless interface, or other means for transmission of digital data between physically separated components. Data link 27 may provide serial, parallel, synchronous or asynchronous transmission between universal controller 10 and first external device 11, depending on the needs of the user. Bus translator module 17 formats data (e.g. parses the incoming bit streams) that it receives from external device 11 over data link 27 for output to protocol registers 19, status registers 21, and data registers 23. Protocol data may be parsed to the protocol registers 19, status and/or error data may be parsed to the status registers 21, and content data (i.e. read or write data) may be parsed to the data registers 23. In addition, bus translator module 17 receives data incoming from a second external device through the protocol registers 19, status registers 21, and data registers 23, and formats the incoming data for output to external device 11. Data may be received from these registers via a bus or trace 29 that is internal to circuit 15. In this way, bus translator module 17 continuously monitors data flow to and from external device 11, and data flow to and from protocol registers 19, status registers 21, and data registers 23.

In one embodiment, bus translator module 17 includes a processor, for example, an embedded processing core in an FPGA or ASIC. The processor may employ an embedded operating system such as LINUX, or it may use a RISC based system. In other embodiments, bus translator module may also include embedded memory blocks, clocking functions, and/or one or more embedded data transceivers that may be required for performance of its functions described herein.

A primary function of bus translator module 17 is recognition of a protocol being employed during a data transmission. A pattern of bits received at bus translator module 17, for example, from first external device 11, will exhibit a characteristic unique to a particular communication protocol. Bus translator module identifies the communication protocol based on that characteristic. Bus translator module may then parse the bit stream, for example, by writing protocol information to protocol registers 19, writing status and/or error information to status registers 21, and writing content information to data registers 23.

Registers 19, 21, and 23 are memory allocations within circuit 15 which are used to structure how individual operations of circuit 15 are set up and implemented. In an ASIC or FPGA, these memory allocations may be provided from logic blocks or logic cells embedded in the integrated circuit. Each of these registers is coupled to a protocol firmware module 25 that includes a plurality of different protocol drivers, each of which supports a particular data communication protocol.

Protocol registers 19 specify to the protocol firmware module 25 which protocol of the multiple protocols supported by the protocol drivers is being used in the transmission of a current data communication. The current data communication may be a read or a write function originating from external device 11, or it may be a read or write function originating from a second external device. The protocol registers 19 may also specify whether the current data communication is a read function or a write function. For example, a read or write function could be an 8 bit, 16 bit or 32 bit value in a data stream. The bit stream pattern may trigger a protocol register to set a flag value representing a read or a write.

Status Registers 21 may hold information for both the bus translator module 17 and the protocol firmware module 25 to inform either of these modules of pending work, i.e. the presence of an incoming data communication or bit stream. For instance, if there is data available in from protocol registers 19, then a value may be set in the status registers 21 to indicate to bus translator module 17 that there is data available from a particular protocol driver. Status registers 21 may also indicate to the protocol firmware module 25 that there is data available from bus translator module 17 for a particular protocol driver.

Data Registers 23 may store data being communicated via universal controller 10. Data registers 23 may include read registers for return of read data to external device 11 or to a second external device. Data registers may include write registers for transmission of write data from external device 11 or from a second external device. Data registers may also include error registers used to return fixed or user-defined errors generated from currently running operations within circuit 15. In one embodiment, data registers may serve as queues or buffers during asynchronous processing of the data communications. In another embodiment, data registers 23 may include an external memory buffer (not shown) that may be accessed in conjunction with embedded portions of data registers 23 to provide additional memory that may be required when universal controller 10 manipulates large amounts of data. Such an external memory buffer may be external to circuit 15, but in a preferred embodiment the external memory buffer may be physically installed on the universal controller board 10.

Circuit 15 is equipped with a protocol firmware module 25 that includes a plurality of protocol drivers. In one embodiment, protocol firmware module may also include a control interface for selecting a protocol driver required for a particular data communication. Protocol firmware module 25 is coupled to each of the protocol registers 19, status registers 21, and data registers 23 via the internal bus 29. A protocol driver of protocol firmware module 25 may include firmware embedded within a portion of circuit 15, e.g., within the logic cells of an FPGA, to provide the functionality required for proper data representation, signaling, authentication and/or error detection according to a particular protocol standard. For example, embedded software instructions of a protocol driver may ensure proper bit encoding, grouping, frame identification, data conversion, addressing, etc. in accordance with rules specified by the corresponding protocol standard.

According to the invention, there is no limit to the type and number of protocol drivers that may be included within protocol firmware module 25. In practical terms, however, memory or other physical limitations of circuit 15 will limit the actual number of protocol drivers available in any specific embodiment of a universal controller 10. The protocol drivers may support a custom protocol, or they may be selected from a group of commonly used protocols, such as IEEE protocols, CAN-bus protocols, MIL-STD protocols, and other more specialized industrial protocols such as ARCINC. For example, protocol firmware module 25 may include an ISO 13239 High-Level Data Link Controller (HDLC) protocol, which may be communicated over an IEEE 488 or GPIB bus. This may be provided by protocol firmware module 25 for user defined data manipulation, or for custom data clocking or transceiving.

Other possible protocols supportable by a protocol driver of protocol firmware module 25 include IEEE-488.1 and IEEE-488.2 (general purpose interface), IEEE-802.3 (Local Area Network and Ethernet standards), ISO 11898-2 (CAN high-speed standard), ISO 11898-3 (CAN fault-tolerant (low-speed) standard), ISO 11992-1 (CAN fault-tolerant standard for truck/trailer communication), ISO 11783-2 (250 kbit/s, Agricultural Standard), SAE J1939-11 (250 kbit/s, Shielded Twisted Pair (STP) standard), SAE J1939-15 (250 kbit/s, UnShielded Twisted Pair (UTP) reduced layer standard), SAE J2411 (Single-Wire CAN (SWC) standard, MIL-STD-1553 (serial data bus standard for military avionics, and spacecraft on-board data handling (OBDH) subsystems), MIL-STD-1773 (fiber optic bus. Standard for on-board command and telemetry transfer between military spacecraft components, subsystems and instruments), and ARINC-429 (commercial aircraft standard for on-board for continuous delivery of system status).

The list of protocol standards in the preceding paragraphs is given only as an example, and is not intended to circumscribe a finite population to limit the scope of the invention. Any combination of the above protocol standards may be included within a protocol firmware module 25 according to the invention, and additional protocol standards not listed above but known to those skilled in the relevant art may also be incorporated in a universal controller within the scope of the invention.

Software commands may be implemented at a high level to set up each of these protocols for use. In one embodiment, each protocol may be processed asynchronously of each other protocol. In another embodiment, two or more of the protocols may be processed simultaneously. In yet another embodiment, more than three protocols may be processed over the same time period, either simultaneously or asynchronously, depending on hardware limitations.

One or more second external devices (not shown) may connect to universal controller 10 via the field interface 13. Field interface 13 may include or be coupled to one or more input/output (I/O) ports. The I/O ports may be multi-pin electrical connectors on the field side of field interface 13 suitable for supporting the data communication protocols of protocol firmware module 25. In one embodiment, the I/O ports may include at least two connectors of different types. For example, field interface 13 may include one or more standard configuration serial ports, one or more standard configuration parallel ports, and/or one or more USB ports. In another embodiment, one or more of the I/O ports may be a wireless transceiver. Through these ports, the second external devices may be coupled or cabled directly to universal controller 10 via field interface 13.

Figure 2:
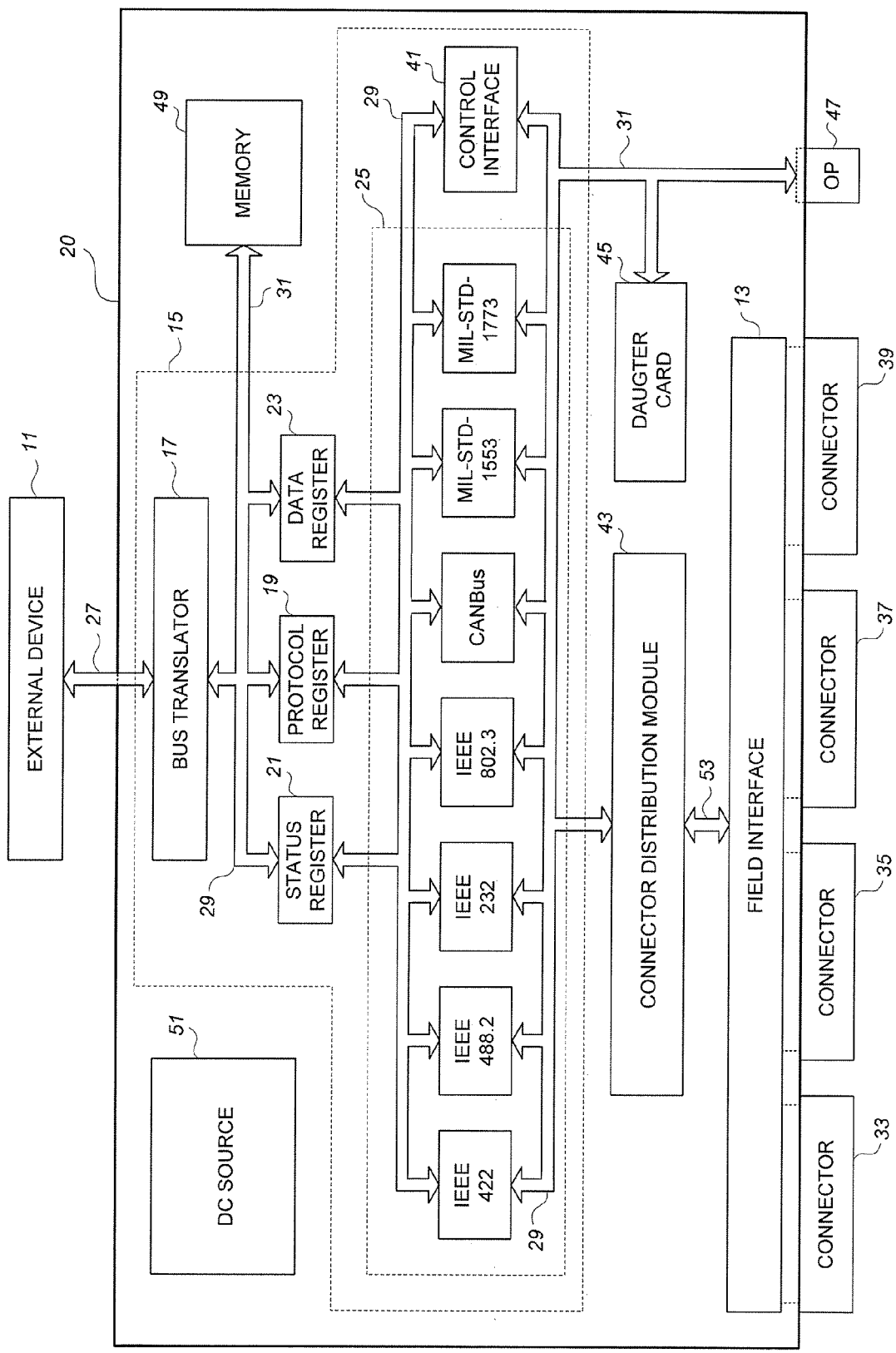
FIG. 2 is a block diagram of another embodiment of a universal controller according to the invention for enabling data communication between external devices using any of multiple communication protocols.

FIG. 2 provides a more detailed block diagram of a universal controller according to another embodiment of the invention. Universal controller 20 comprises a plug-in card or printed circuit board connectable to a first external device 11 via a connection means 27, and connectable to one or more second external electronics devices (not shown) via a field interface 13. In this embodiment, four I/O ports—33, 35, 37, and 39—are shown coupled to field interface 13. A second external device may be coupled to universal controller 20 through an I/O port 33, 35, 37, or 39 to establish a data communications link with the first external device 11. Additional external devices may be coupled to universal controller 20 through the same I/O ports. Control of communication protocols is effected by means of an integrated circuit 15, preferably an FPGA or ASIC, which includes all modules enclosed by the dashed line shown in the figure. Data flow between modules of circuit 15 is enabled by internal traces 29. Data flow to and from other components of universal controller 20 external to circuit 15 is enabled by a board-mounted bus 31.

As in the previous diagram, first external device 11 may be coupled to a bus translator module 17 of universal controller 20 via a data link 27. Bus translator module 17 is shown coupled via bus 29 to a protocol register 19, a status register 21, and a data register 23, as in the previous embodiment. These registers are coupled to a row of protocol drivers that collectively represent a protocol firmware module 25. The protocol drivers are labeled IEEE 422, IEEE 488.2, IEEE 232, IEEE 802.3, CANBus, MIL-STD-1553, and MIL-STD-1773. Each of these protocol drivers may be embedded firmware providing all functionality required to process data according to the particular communication protocol that corresponds to its label. Although only seven protocol drivers are shown in FIG. 2, it is understood that this specific group of drivers is presented only as an example, and that many other combinations of protocol drivers, whether custom or standard, may compose a protocol firmware module according to the invention.

A control interface module 41 is modeled as a singular functional block on the right-hand side of protocol firmware module 25. Control interface module 41 represents multiple additional digital controls commonly found on or embedded within an ASIC or FPGA that may be optional or necessary for functionality. For example, control interface module 41 may include a clocking function, an analog-to-digital converter, a digital-to-analog converter, a digital signal processor or filter, and/or other circuits functioning as logic or discrete components. Control interface module may include a control interface for protocol selection, and for read and write of data.

Universal controller 20 may include additional components that are external to circuit 15, including a connector distribution module 43, a daughter card 45, a fiber optic transceiver 47, a memory module 49. These components may be interconnected with other board-mounted components by means of bus 31.

Connector distribution module 43 provides signal level drivers for transmission via field interface 13. Connector distribution module 43 may operate as a switching device to customize signal paths 53 running between protocol interface module 25 and field interface 13. This ensures that signals communicated according to a particular protocol are distributed to the correct multi-pin connector of connectors 33, 35, 37, and 39, and that the signals are allocated to the correct pins of the connector. In one embodiment, connector distribution module 43 may include a high frequency switch for performing the signal path customization.

A daughter card 45 may be installed on a universal controller 20 by connection to a card slot or equivalent on-board receptacle that is coupled to bus 31. In one embodiment, a daughter card 45 may include an additional one or more protocol drivers to augment the total population of protocols that universal controller 20 may process. The additional protocol drivers on a daughter card 45 may interface with bus translator 17, registers 19, 21, and 23, and connector distribution module 43 similarly as any other protocol driver within protocol firmware module 25.

Optical transceiver 47 may be included on universal controller 20 to provide an alternate means for communicating data. Optical transceiver allows universal controller 20 to interface a first external device 11 with a second external device that tranceives via optical fiber. Memory module 49 may be provided to augment the data storage capacity of the universal controller. In one embodiment, memory module 49 provides additional capacity for information to be stored in a data register 23, for example, read and write content data communicated between the first and second external devices. Memory module 49 may be any board-mountable memory chip, or group of memory chips, known in the art and suitable for this purpose.

Power for universal controller 20 may be provided from an external source or from a board-mounted source. FIG. 2 shows a board-mounted power supply, DC source 51. DC source 51 may provide all DC voltages required by the board-mounted components. DC source 51 may comprise one or more batteries, or may be a power supply or battery charger converting external power to DC voltages required by the universal controller. For simplicity, ground connections and positive and negative voltage terminals between DC source 51 and the board mounted components are not shown. DC source 51 may be an optional or supplemental component in embodiments where DC power is supplied directly from external device 11, for example, through a USB connection.

A universal controller of the present invention may comprise a single computer board that can support multiple different communication protocols. The universal controller 10 or 20, configured as above, can be used as a standalone device, or as a plug-in card controlled by a PC or other master controller. For example, the universal controller may replace one or more existing interface cards installed on a PC. Advantageously, the universal controller may allow more than one protocol to be used simultaneously, for example, to enable a first external device to communicate with a second external device according to one protocol, while enabling the first external device to communicate with a third external device according to a different protocol. Or, the universal controller may simultaneously transmit using more than one protocol for redundant transmission of the same communication from a first external device to multiple second external devices. The universal controller may therefore be implemented in redundancy designs for must-operate systems, such as mission critical systems in aircraft, safety systems in nuclear power plants, and the like that require redundancy to ensure availability at all times.

Figure 3:
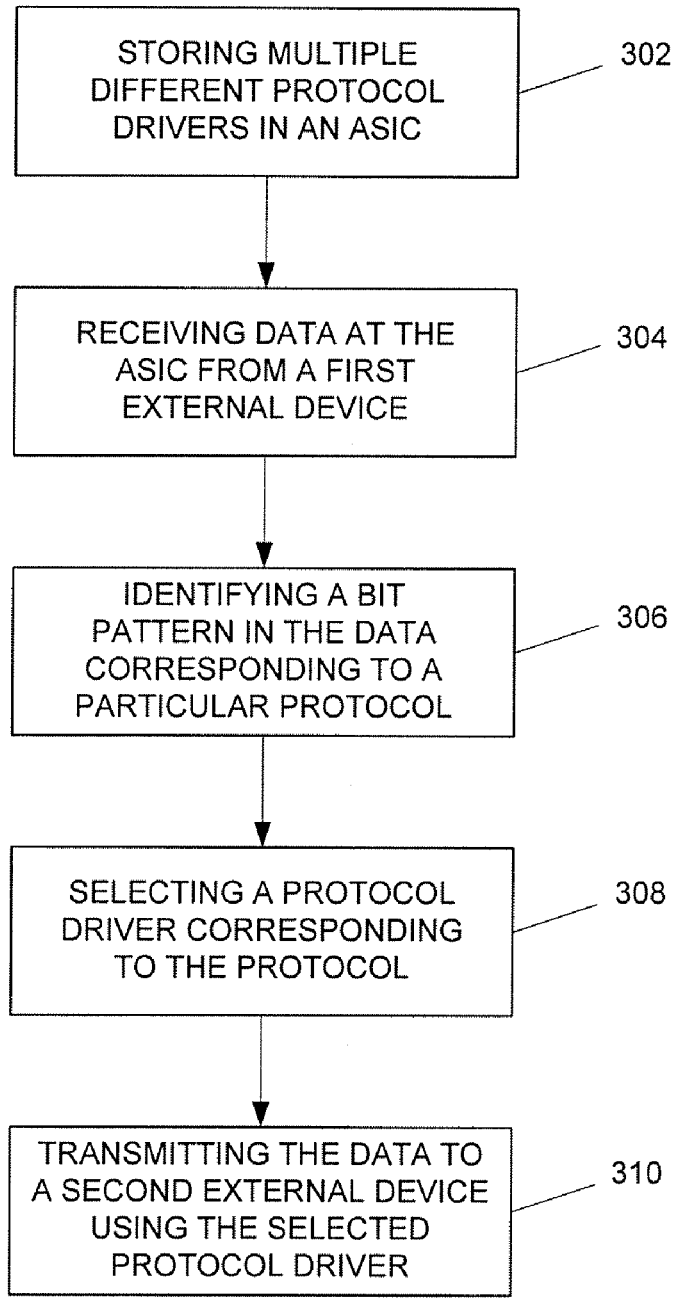
FIG. 3 is a flow chart of a method according to the invention for enabling data communication between external devices using any of multiple communication protocols.

FIG. 3 illustrates a process or method 300 according to the foregoing principles of the invention. The initial step of the method begins is step 302. In this step, multiple different protocol drivers are stored or embedded within an integrated circuit such as an FPGA or ASIC on a universal controller disclosed herein. This step may be a manufacturing step, or a step performed by an end user for loading or upgrading firmware. The remaining steps may be carried out as a series of software instructions executed by the universal controller.

In the next step 304, data is received from a first external device at the integrated circuit. This step includes receiving data communicated from any device external to the integrated circuit, such as data originating from a computer or field device and data processed through one or more other intermediate components or modules of the universal controller. The next step 306 is an identifying step wherein a bit pattern in the data received at the integrated circuit is identified. Identifying the bit pattern means detecting a characteristic in the bit pattern that is indicative of or corresponds to a particular computer protocol. Then, in step 308, a particular protocol driver of the multiple protocol drivers is selected that corresponds to the computer protocol identified in the previous step. In the final step 310, the data is transmitted to a second external device using the particular protocol driver that was selected in the preceding step.

It shall be understood that the data communication of method 300 may originate from either the first external device or one or multiple second external devices, as defined according to the system embodiments herein. Also, additional embodiments of a method according to the invention are possible, which methods may include a different set of process steps, such as steps implied throughout the foregoing description of system embodiments. For example, the identifying step 306 may include an action identifying whether the data received comprises a read function or a write function. Or, the receiving step 304 may include an action storing data received at the integrated circuit in a data register or other memory until the content of the received data is transmitted.

The universal controller of the present invention will lead to considerable cost savings in computer systems for both industrial and consumer use. Instead of purchasing many different cards or instruments for different signaling devices, a user need only purchase a single universal controller card that has all of the necessary protocols built in. The universal controller will also minimize packaging and system assembly problems, by making it possible to route multiple communication lines through a single interface that can process two or more protocols simultaneously. From a design standpoint, fewer components, less cabling, and quicker time-to-market are among the many advantages to be realized by implementing a universal controller according to the invention.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A universal controller for enabling data communication between external electronic devices using any of multiple communication protocols, the universal controller comprising:

a bus translator connectable to a first external device and transceiving data thereto;

a field interface connectable to a second external device and to a third external device;

a protocol firmware module having a plurality of protocol drivers each corresponding to one of the multiple communication protocols and coupled to the field interface;

a control interface coupled to the bus translator and the protocol firmware module; and a connector distribution module for customizing signal paths from the protocol firmware module to the field interface;

whereby responsive to data received from the first external device, the bus translator specifies to the control interface a first protocol of the multiple communication protocols to enable the protocol firmware module to establish simultaneously data communication between (i) the first and second external devices and (ii) the first and third external devices using the protocol driver that corresponds to the first protocol, and to enable the connector distribution module to allocate simultaneously (i) signals communicated to the second external device among pins of a multi-pin connector according to a second protocol of the multiple communication protocols and (ii) signals communicated to the third external device among pins of another multi-pin connector according to a third protocol of the multiple communication protocols.

2. The universal controller of claim 1 wherein the control interface further comprises a plurality of registers.

3. The universal controller of claim 2 wherein the plurality of registers further comprises protocol registers for specifying the first protocol of the multiple communication protocols.

4. The universal controller of claim 2 wherein the plurality of registers further comprises status registers for indicating availability of data corresponding to a specified one of the multiple communication protocols.

5. The universal controller of claim 2 wherein the plurality of registers further comprises data registers for storing the data.

6. The universal controller of claim 1 embodied within an integrated circuit.

7. The universal controller of claim 6 wherein the plurality of registers further comprises data registers external to the integrated circuit for storing the data.

8. The universal controller of claim 1 wherein the multiple communication protocols are selected from the group comprising IEEE-485, ISO 13239, IEEE 488.1, IEEE 488.2, IEEE 802.3, ISO 11898-2, ISO 11898-3, ISO 11992-1, ISO 11783-2, SAE J1939-11, SAE J1939-15, SAE J2411, MIL-STD-1553, MIL-STD-1773, and ARINC-429.

9. The universal controller of claim 1 wherein the bus translator is connectable to a first external device selected from the group comprising a personal computer, a micro controller unit, a central processing unit, a universal serial bus, a PCI bridge, and an Ethernet connection.

10. The universal controller of claim 1 wherein the field interface is coupled to a plurality of I/O ports wherein at least two of the I/O ports comprise connectors of different types.

11. The universal controller of claim 10 further comprising at least one transceiver coupled between the field interface and the control interface.

12. The universal controller of claim 1 further comprising at least one card slot for removably connecting to the protocol firmware module a daughter card having a protocol driver.

13. The universal controller of claim 1 wherein the connector distribution module customizes the signal paths according to the desired protocol by means of high frequency switching.

14. An application specific integrated circuit (ASIC) for enabling data communication between external electronic devices using multiple different communication protocols, the ASIC comprising:

a bus translator module;

a protocol firmware module having a plurality of protocol drivers each corresponding to one of the multiple different communication protocols; and a control interface coupled between the bus translator module and the protocol firmware module;

whereby, responsive to data received from a first external device, the bus translator module simultaneously specifies (i) a first communication protocol of the multiple different communication protocols to the control interface to direct the protocol firmware module to establish data communication between the first external device and a second external device using a first protocol driver of the plurality of protocol drivers that corresponds to the first communication protocol and (ii) a second communication protocol of the multiple different communication protocols to the control interface to direct the protocol firmware module to establish data communication between the first external device and a third external device using a second protocol driver of the plurality of protocol drivers that corresponds to the second communication protocol.

15. A method for enabling data communication between external electronic devices using any of multiple different communication protocols, comprising:

storing a plurality of protocol drivers in an application specific integrated circuit (ASIC), each protocol driver corresponding to one of the multiple different communication protocols;

receiving data at the ASIC from a first external device;

identifying a bit pattern in the received data that corresponds to a particular communication protocol of the multiple different communication protocols; and selecting content data from the received data responsive to identifying the bit pattern corresponding to the particular communication protocol; and transmitting simultaneously the selected content data to (i) a second external device according to a second communication protocol and (ii) a third external device according to a third communication protocol.

16. The method of claim 15 wherein the identifying step further comprises identifying whether the received data comprises a read or a write function.

17. The method of claim 15 wherein the receiving step further comprises storing the received data in a data register until the received data is transmitted.

* * * * *